US008854180B2

(12) United States Patent
Bacarella

(10) Patent No.: US 8,854,180 B2
(45) Date of Patent: Oct. 7, 2014

(54) ACCESS CONTROL SYSTEM

(75) Inventor: Joseph Bacarella, Laurel, MD (US)

(73) Assignee: Pro Tech Systems of Maryland, Inc., Laurel, MD (US)

( * ) Notice: Subject to any disclaimer, the term of this patent is extended or adjusted under 35 U.S.C. 154(b) by 828 days.

(21) Appl. No.: 12/684,944

(22) Filed: Jan. 10, 2010

(65) Prior Publication Data

US 2010/0176917 A1 Jul. 15, 2010

Related U.S. Application Data

(60) Provisional application No. 61/143,773, filed on Jan. 10, 2009.

(51) Int. Cl.

| | |
|---|---|
| ***G05B 19/00*** | (2006.01) |
| ***E05B 63/14*** | (2006.01) |
| ***G07C 9/00*** | (2006.01) |
| ***E05B 65/00*** | (2006.01) |
| ***E05B 47/02*** | (2006.01) |
| *E05B 47/00* | (2006.01) |
| *E05B 51/02* | (2006.01) |

(52) U.S. Cl.
CPC ............ *E05B 63/14* (2013.01); *G07C 9/00571* (2013.01); *E05B 65/0075* (2013.01); *E05B 47/0002* (2013.01); *E05B 47/026* (2013.01); *G07C 9/00166* (2013.01); *G07C 9/00134* (2013.01); *G07C 9/00912* (2013.01); *E05B 51/02* (2013.01)
USPC .......................................... 340/5.6; 340/5.73

(58) Field of Classification Search
USPC ..................................... 340/1.1, 5.1, 5.2, 5.6
See application file for complete search history.

(56) References Cited

U.S. PATENT DOCUMENTS

| | | | | |
|---|---|---|---|---|
| 3,527,176 | A * | 9/1970 | Losapio | 109/57 |
| 4,083,424 | A * | 4/1978 | von den Stemmen et al. | 180/289 |
| 4,892,345 | A * | 1/1990 | Rachael, III | 296/24.37 |
| 5,484,092 | A * | 1/1996 | Cheney | 224/404 |
| 5,778,805 | A * | 7/1998 | Green | 109/51 |
| 7,129,817 | B2 * | 10/2006 | Yamagishi | 340/5.53 |
| 7,178,729 | B2 * | 2/2007 | Shaffer et al. | 235/385 |
| 7,963,073 | B1 * | 6/2011 | Pellegrene et al. | 52/125.2 |
| 8,539,790 | B1 * | 9/2013 | Budd | 62/457.9 |
| 2002/0055380 | A1 * | 5/2002 | Luciano et al. | 463/16 |
| 2007/0245369 | A1 * | 10/2007 | Thompson et al. | 725/30 |
| 2007/0257773 | A1 * | 11/2007 | Hill et al. | 340/5.73 |
| 2008/0097924 | A1 * | 4/2008 | Carper et al. | 705/65 |

FOREIGN PATENT DOCUMENTS

| | | | |
|---|---|---|---|
| ZA | 9209181 | A * | 7/1993 |

* cited by examiner

*Primary Examiner* — Brian Zimmerman
*Assistant Examiner* — Sara Samson
(74) *Attorney, Agent, or Firm* — Banner & Witcoff, Ltd.

(57) ABSTRACT

An access controlled storage device may include multiple doors, each having a different lock, to insure safety and security of the contents of the storage device. In one example, the access controlled storage may include a first outer door having a physical lock and a second interior door having an electronic lock. The physical lock and the electronic lock may require different keys. Additionally or alternatively, unlocking the interior door may require unlocking of the first door in an authorized manner. Access and inventory data may be transmitted to or received from remote devices through wireless communication networks.

20 Claims, 6 Drawing Sheets

ACCESS CONTROL SYSTEM

CROSS-REFERENCE TO RELATED APPLICATION

This application is a non-provisional application of and claims the benefit of priority from co-pending provisional application No. 61/143,773, entitled "ACCESS CONTROL SYSTEM," and filed on Jan. 10, 2009.

FIELD

The invention relates generally to access security systems. More specifically, the invention provides a system that provides multiple layers of security to control access to sensitive or controlled items and recordkeeping.

BACKGROUND

Access to many types of substances, devices, and items are subject to strict controls due to their sensitivity or potential to cause harm. In the medical field, for instance, there are many drugs and medicines that can be helpful when used appropriately (e.g., in correct dosages), but that may also cause harm if used improperly (e.g., in large doses). In one example, morphine is often used as a pain-killer. However, when consumed or used improperly, morphine may also result in harm such as addiction or gangrene. The addictive nature of such controlled substances may also increase the risk of theft, threatening those that are charged with transporting such substances.

To control the use and distribution of potentially harmful substances, various jurisdictions and agencies such as the U.S. Drug Enforcement Administration (DEA) have issued requirements for storage devices that are used to store and transport controlled substances including Schedule II drugs as defined under the Controlled Substances Act in the United States. With the enactment of such requirements, some jurisdictions have removed controlled substances from vehicles such as emergency vehicles altogether due to the lack of a suitable storage device and/or tracking systems. Without controlled substances in such vehicles, emergency personnel may often be unable to adequately address injuries or other health related issues at the site of the emergency. Some injuries may lead to more serious conditions if not treated immediately. Accordingly, storage devices are needed to securely transport drugs and to track access.

SUMMARY

Aspects of the present disclosure relate to an access controlled storage device that may include multiple doors, each having a different lock. Access to an interior compartment may require unlocking of both locks and doors. Unlocking of an interior door/lock may further require the authorized unlocking of an outer door/lock. A first lock may comprise a mechanical lock while a second lock may comprise an electronic lock. Electronic lock authorizations may be stored in a data access device that is located separately from the access controlled storage device. Access to the data access device may include a further lock. Each lock may require a different key. In one or more arrangements, unauthorized opening of an outer door or unauthorized unlocking of the outer lock may cause the interior door or lock to enter a fail safe mode.

According to another aspect, access to one or more doors/locks may be recorded by a data access device or other storage and tracking device. In one example, access information including the identities of accessing individuals and inventory changes in the interior compartment may be transmitted to a remote server through a wireless communication channel/network.

According to another aspect, an access controlled storage device may be remotely controlled. For example, a user at a central system or office may send remote commands to one or more access controlled storage devices located in mobile units (e.g., vehicles) or stationary locations. These commands may include lock, unlock, add user, remove authorized user, enter fail safe mode and the like.

BRIEF DESCRIPTION OF THE DRAWINGS

Various objects, features, and advantages of the present disclosure will be more readily apparent and more fully understood from the following detailed description, taken in connection with the appended drawings, in which.

DETAILED DESCRIPTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

One or more aspects of the present disclosure may be embodied in computer-usable data and computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like. Particular data structures may be used to more effectively implement one or more aspects of the invention, and such data structures are contemplated within the scope of computer executable instructions and computer-usable data described herein.

Figure 1:
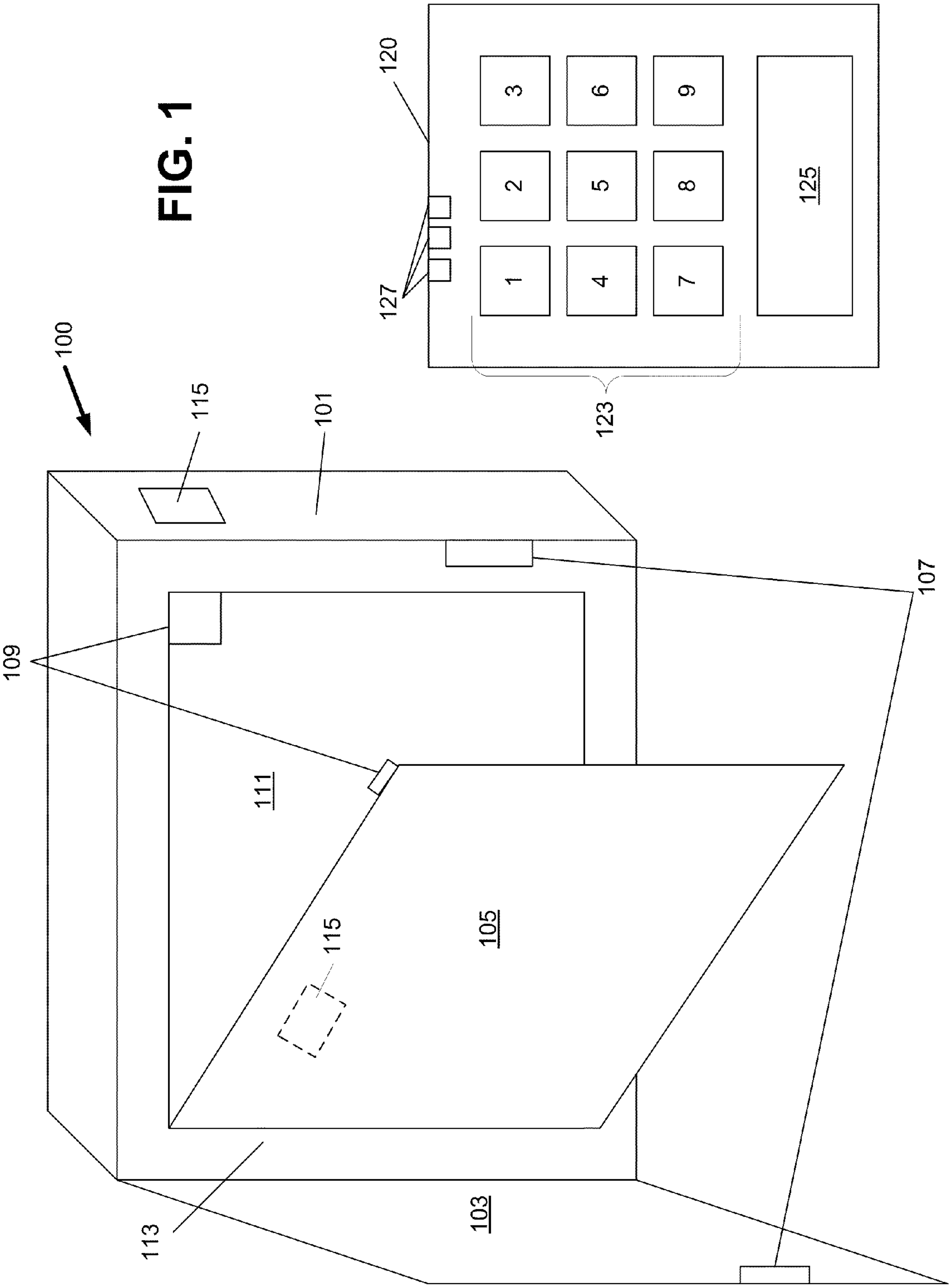
FIG. 1 is a block diagram of an example access control device in which items may be secured according to one or more aspects described herein.

FIG. 1 illustrates an example block diagram of a drug storage device. Drug storage device 100 may include a housing 101 made of various materials such as steel, iron, metallic alloys, plastics, composite materials, such as KEVLAR, and the like. The material used may be resistant to a specified amount of impact such as from dropping the device 100 from a predetermined height, e.g., 100 feet, or from a bullet or other explosive device. The thickness of the housing walls may also be designed to withstand specified forces. Additionally or alternatively, the material chosen may provide protection to the contents of the device 100 from moisture. In some arrangements, the housing 101 may include an insulating layer configured inside the housing 101, between layers of the housing 101, etc. in order to aid in maintaining a controlled temperature environment within the housing 101 to protect the substances being transported therein. According to one or more arrangements, housing 101 may comprise a singular structure (e.g., in contrast to two storage devices, one placed inside the other) and include multiple doors. For example, as shown in FIG. 1, housing 101 includes two doors 103 and 105. Additional doors or door structures may be used as desired. The outer door 103 may include a first lock 107 that controls access to the second door and the second door 105 may include a second lock 109 that controls access to the interior compartment 111. Doors 103 and 105 may be attached to housing 101 on a first sidewall 113 in a variety of manners including various types of hinges, such as a security butt hinge, etc. In some examples, the hinge may be an internal hinge, i.e., the hinge components may be embedded in the door 103, 105 and housing 101, respectively, in order to prevent access to the hinge when the door is in a closed configuration. In other examples, the door 103, 105 may be a sliding door, such as a pocket door. Doors 103 and 105 may comprise the same material as housing 101 or may comprise additional or alternative materials. In one example, doors 103 and 105 may be composed of a transparent or semi-transparent material so that an individual may view the contents of storage device 100 without opening it or may confirm that the contents are within the storage device 100. A portion of locks 107 and 109 may be attached to an interior surface of housing 101 while a second portion of locks 107 and 109 may be attached to each respective door.

Locks 107 and 109 may be electronic, mechanical, magnetic, electromagnetic and the like. An example of an electric lock that may be used to secure one or more of doors 103 and 105 is Rutherford Controls' 3513 Electric Lock. In one embodiment, lock 107 comprises a mechanical key lock (e.g., a cylindrical mechanical triple bolt) while lock 109 comprises an electronic key lock. For example, lock 107 may be configured to receive a physical key and to unlock if the physical key is correct. Lock 109, on the other hand, may be unlocked by swiping a HUGHES identification device (HID), contactless card devices, a radio frequency identifier (RFID) device by a scanner 115, etc. The scanner 115 may be located on an exterior surface of housing 101 or an exterior surface of door 105. By placing the scanner 115 on an exterior surface of door 105, but interior to the first door 103, the storage device 100 may insure that the electronic lock 109 can not be unlocked until the first door 103 is unlocked. Such a configuration may be used to increase the time a thief might need to unlock both locks 107 and 109 to access the contents of storage device 100. Moreover, using an electronic lock may allow a tracking system to automatically and electronically record accesses to compartment 111. For example, when an authorized user scans a proper electronic key using scanner 115, the key's identifier may be stored in an electronic database along with a time of access, a duration of access, change in compartment inventory and the like. For example, the duration of access may be detected based on a length of time between when the interior door (e.g., door 105) is opened and when it is closed. The database may be located within compartment 111 or may be stored external to device 100. A key's identifier may be associated with a user identifier so that the user's identity may also be linked with storage transactions. Alternatively, in some examples, lock 109 may be a mechanical lock, while lock 107 may be an electronic lock as described above.

With the use of only mechanical locks, a user may need to manually record access, which may be prone to mistakes or forgeries. Use of an electronic long, or a combination of lock types, provides additional security and may permit tracking of access to the contents and/or interior of the storage device 100. Additional doors and/or locks may also be added based on purpose and/or need (e.g., the DEA requires two locks for schedule 1 and schedule 2 narcotics). In some instances, for example, drug storage requirements issued by a jurisdiction may require 3, 4 or 5 doors or locks. Alternatively or additionally, a door may include multiple locks. A door may further include a single key receptacle, but multiple locking members (e.g., a locking bolt for each of multiple sides of the door). Additionally or alternatively, the doors 103 and 105 may include biometric scanners, thereby requiring a user to submit to biometric identity verification, such as iris scan, fingerprint scan, voice recognition, and the like. In still other arrangements, a password or passcode may be required to obtain access to the interior of the device. That is, the electronic lock (e.g., lock 109) may include a keypad for entry of a password or code for unlocking the electronic lock (instead of or in addition to the scanning unit 115). In such cases where a password or alphanumeric identifier is required in order to access a storage device such as device 100, a new password or identifier may be transmitted to potential users on a daily, weekly, monthly, etc. basis. That is, the password may change periodically in order to provide an added level of security. The changed passwords may be generated by a central security server, another remote system, the data access device 120 and the like. These additional security measures (e.g., biometric data, passcode, etc.) may be used in combination with various types of locking mechanisms, such as those described above.

In one ore more arrangements, a user may be asked to log changes in the inventory when the storage device 100 is accessed. An alphanumeric or numeric keypad may be provided as part of scanner 115, for example, or as a separate device to allow the user to identify the drugs or other items being deposited into or withdrawn from storage device 100. For example, the keypad may expect a predefined sequence of numbers or information such as <drug/item ID #><withdrawal or deposit><amount>. Withdrawal or deposit may be represented by a numeric code such as 1 for a withdrawal and 2 for a deposit. The drug or item identifier may be predefined as include a specific number of digits (e.g., 5, 8, 9, 20, etc.).

Interior compartment 111 may be configured in a variety of ways depending on the needs of the user. For example, interior compartment 111 may be refrigerated or otherwise temperature controlled to maintain the viability of various substances. In another example, compartment 111 may include dehumidifying or humidifying controls. In some arrangements, the temperature and/or humidity of the compartment 111 may be transmitted to a control monitoring system that may be located remotely. A control operator may monitor the conditions within the component 111 and adjust as needed, for instance reduce humidity as needed, etc. In still other arrangements, the device may include a controller that monitors the conditions within the compartment 111 and automatically adjusts for any changes. In yet another example, interior compartment 111 may include weight sensors that may determine when contents of compartment 111 have been removed. This may be used, for example, to track and log inventory changes. Additionally or alternatively, compartment 111 may include shelves or other organizational components for storing or securing drugs or other items. Items stored in compartment 111 may be secured to one or more devices in compartment 111 that are configured to detect the movement or removal of items stored therein. In one arrangement, such detection devices may include an optical sensor (e.g., sensor may optically determine when an item is moved), an electromechanical securing mechanism (e.g., opening of the mechanism to remove an item may signify and indicate that the item has been removed or moved) and the like. In some arrangements, each detection device may be associated with a specific substance. For instance, drug 1 may be associated with detection device A in every storage device in use in order to provide consistency throughout devices.

Furthermore, according to one or more aspects, one or more of locks 107 and 109 may automatically resecure/relock upon detecting the corresponding door 103 and 105, respectively, being in a predefined position (e.g., in a fully closed position). The predefined position may be detected by contact sensors (e.g., when an interior surface of the door 103 or 105 contacts a corresponding door frame), using near field sensors that detect when an object is within a predefined distance, and/or optical sensors.

A data access device 120 may be included as part of the storage device 100 to manage access to an electronic lock (e.g., lock 109) of storage device 100 and to provide storage of access data associated with the electronic lock. Data access device 120 may include a keypad 123 for entry of user or key identifiers, a data port 125 (e.g., infrared, USB, Bluetooth, etc.) and one or more indicators 127. Indicators 127 may be used to convey various information such as whether device 120 is powered, whether there is an error, whether the electronic lock is unlocked or locked and the like. The data port 125 may be configured to receive data from and transmit data to an external device such as a data transfer device (not shown). A data transfer device may be portable and may be configured to extract data from data access device 120 wirelessly or through wired connections. Another computing system may then extract the data from the data transfer device as needed (e.g., through a USB connection, wirelessly or through other wired methods). To add authorizations for unlocking an electronic lock, a user may enter a corresponding user or key identifier using keypad 123. Data access device 120 may then store the entered identifier in a list of authorized keys or users. Accordingly, when a user attempts to unlock the electronic lock, the lock may verify with the data access device 120 that the user is authorized to unlock the lock.

While storage devices such as storage device 100 of FIG. 1 may be used in stationary locations such as hospitals, clinics and other buildings, access controlled storage devices might also be included in vehicles. In one example, emergency vehicles such as fire engines, ambulances, emergency helicopters, and the like, might carry controlled substances to the scene of an emergency to provide immediate care. Accordingly, the substances carried in such vehicles may be securely stored to prevent theft, unauthorized use and the like. In some jurisdictions, access controlled storage may be required to carry controlled substances in a vehicle.

Figure 2:
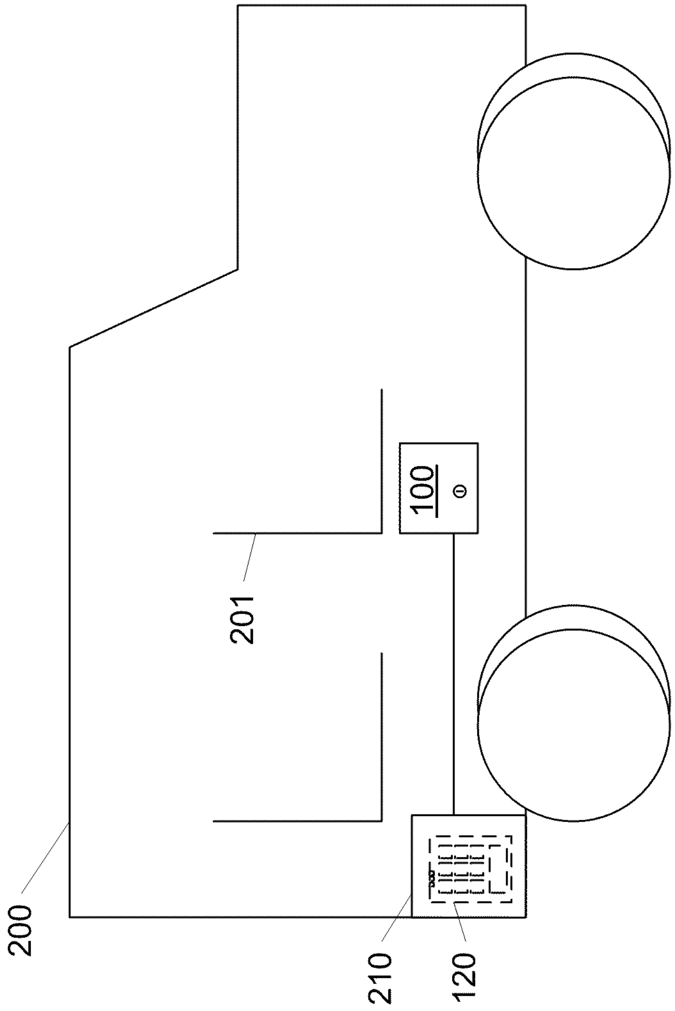
FIG. 2 is a block diagram of an example access control device in an in-vehicle configuration according to one or more aspects described herein.

FIG. 2 illustrates a block diagram of an example drug storage device configured for use in a vehicle. As illustrated, an emergency medical vehicle 200 may include an access controlled storage device 100 in an interior compartment of vehicle 200. Specifically, in the arrangement shown, the storage device 100 may be located beneath a vehicle seat 201. In alternative embodiments, storage device 100 may be placed in a center console. Storage device 100 may be attached to vehicle 200 in a secure manner so that the storage device 100 is not easily removed by unauthorized individuals. For example, storage device 100 may be bolted to the vehicle. A sensor (not shown) may be included in storage device 100 or as part of the vehicle to detect when the storage device 100 is removed from the vehicle or a location in the vehicle. For example, a weight sensor may be placed under storage device 100 to detect when storage device 100 is moved from that location. Data access device 120 may be stored or located in the same compartment or location as storage device 100 or may be placed in a separate location as illustrated in FIG. 2. In the illustration, data access device 120 is disposed in an access controlled compartment 210 separate from storage device 100. Such a configuration may be used so that unauthorized users may be prevented from hacking into or disabling the data access device 120 and circumventing the electronic lock system. For example, an unauthorized user may attempt to register unauthorized key identifiers (e.g., for an electronic key the unauthorized user holds) with the data access device 120 to obtain access to the items stored in storage device 100. Access controlled compartment 210 may include a physical lock, electronic lock or both. The lock for compartment 210 and locks 107 and 109 (FIG. 1) may be associated with different authorizations. That is, a supervisor level user may be authorized to access compartment 210 and locks 107 and 109, while a firefighter or paramedic might only have access to locks 107 and 109 (i.e., to access the contents of storage device 100). The data access device 120 may be configured to store a specified amount of data, e.g., 2000 users and 2000 records/transactions. One example of a data access device 120 that may be used is International Electronics, Inc.'s prox.pad plus iR.

In one or more configurations, storage device 100 and/or data access device 120 may be fail secure devices. That is, without power, storage device 100 would be in a locked state. This prevents individuals from accessing the contents of the storage device 100 without proper authorization or tracking. Storage device 100 and data access device 120 may be connected to battery power directly or through a switch. The switch may be configured to shut power off to the storage device 100 or data access device 120 under certain circumstances, e.g., if the engine is off or if the vehicle is not powered. Alternatively, power may be provided from the battery to storage device 100 and data access device 120 at all times regardless of the state of the vehicle.

In still other examples, the storage device may be configured to fail secure when a form of tampering is detected. That is, if a user fails to input a correct password or passcode a predetermined number of times the device may permanently lock down and may require an additional code or verification (e.g., other than the keys for locks 107 and 109) in order to open. Additionally or alternatively, if an attempt is made to circumvent the locks, physically remove the door, etc. the storage device may lock down to prevent access. Brute force type entry into the compartment may be detected by strain gauges, optical sensors, force sensors, accelerometers and the like. In one example, brute force entry may be detected if a certain amount of force is applied to the door 103 without an appropriate key being inserted into physical lock 107 or without a locking mechanism being released.

Figure 3:
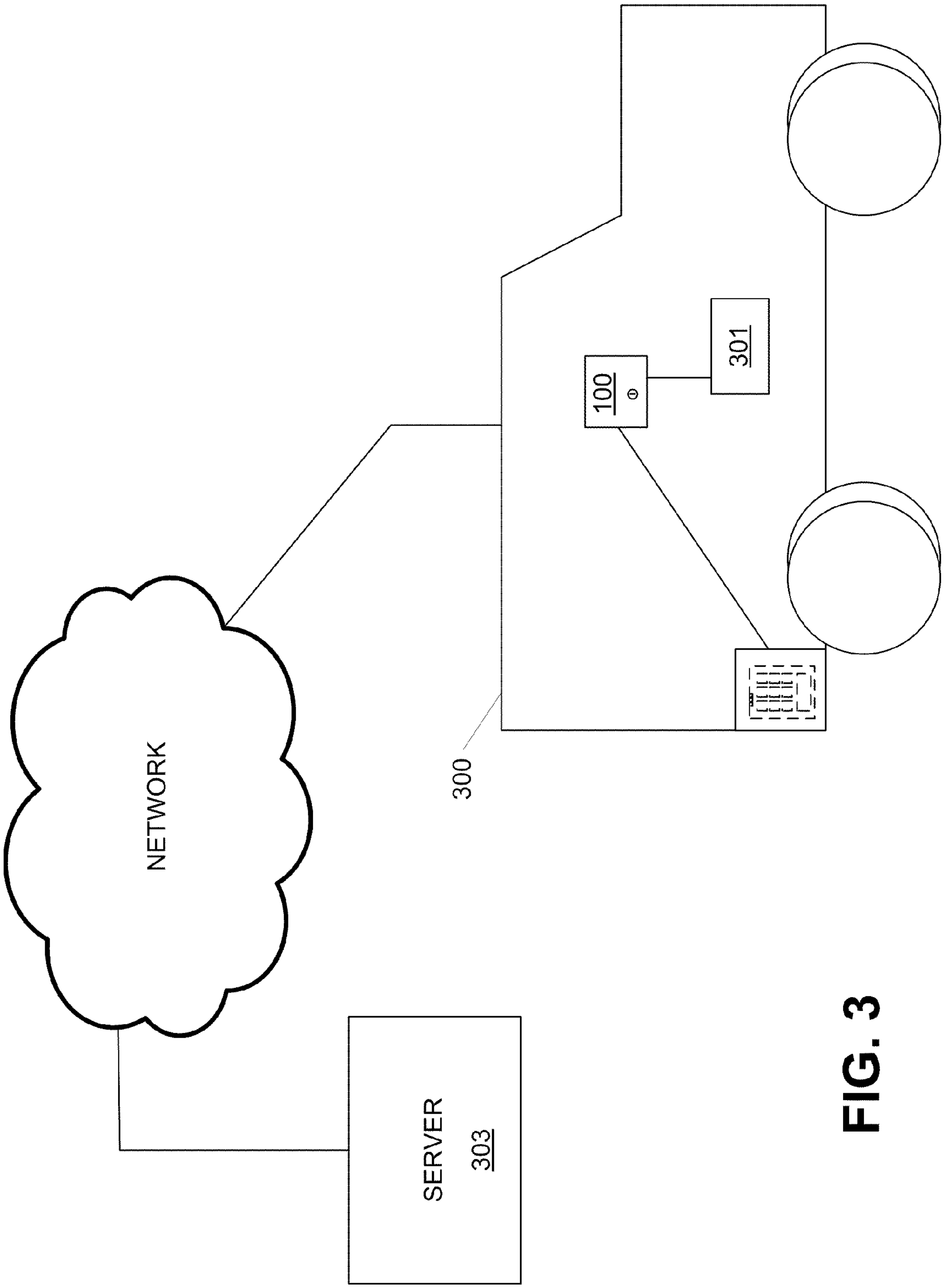
FIG. 3 illustrates an access tracking system in which access data may be transmitted wirelessly through a network according to one or more aspects described herein.

FIG. 3 illustrates an access tracking system in which access data may be transmitted wirelessly through a network. Instead of or in addition to accessing access information using a data transfer device, access information may be transmitted wirelessly through a network to a remote server or other computing system for tracking For example, vehicle 300 may include a storage device such as storage device 100 of FIG. 1. Storage device 100 or vehicle 300 may include a wide-area network access device 301 that provides a connection to a wide area data network such as the Internet. Wide-area network access device 301 may include a 802.11 wireless adapter, a cellular transmitter (e.g., for accessing the Internet through cellular services) and the like. Accordingly, access data recorded by storage device 100 may be transmitted through the wide area data network to a server 303 remote from vehicle 300 without requiring vehicle 300 to be near server 303 or requiring the use of a physical data transportation device. In one or more configurations, server 303 may also transmit commands such as lock down commands to prevent any access to a storage device 100. Additionally or alternatively, server 303 may remotely remove and add authorizations to storage device 100. Still further, server 303 may issue remote commands to selectively activate or deactivate components of the access control system such as individual locks/doors, data access device, sensors within the storage device, temperature and humidity controls and the like. Inventory management data may also be transmitted through a network to a remote location such as server 303 so that inventory needs may be recognized in advance.

Figure 4:
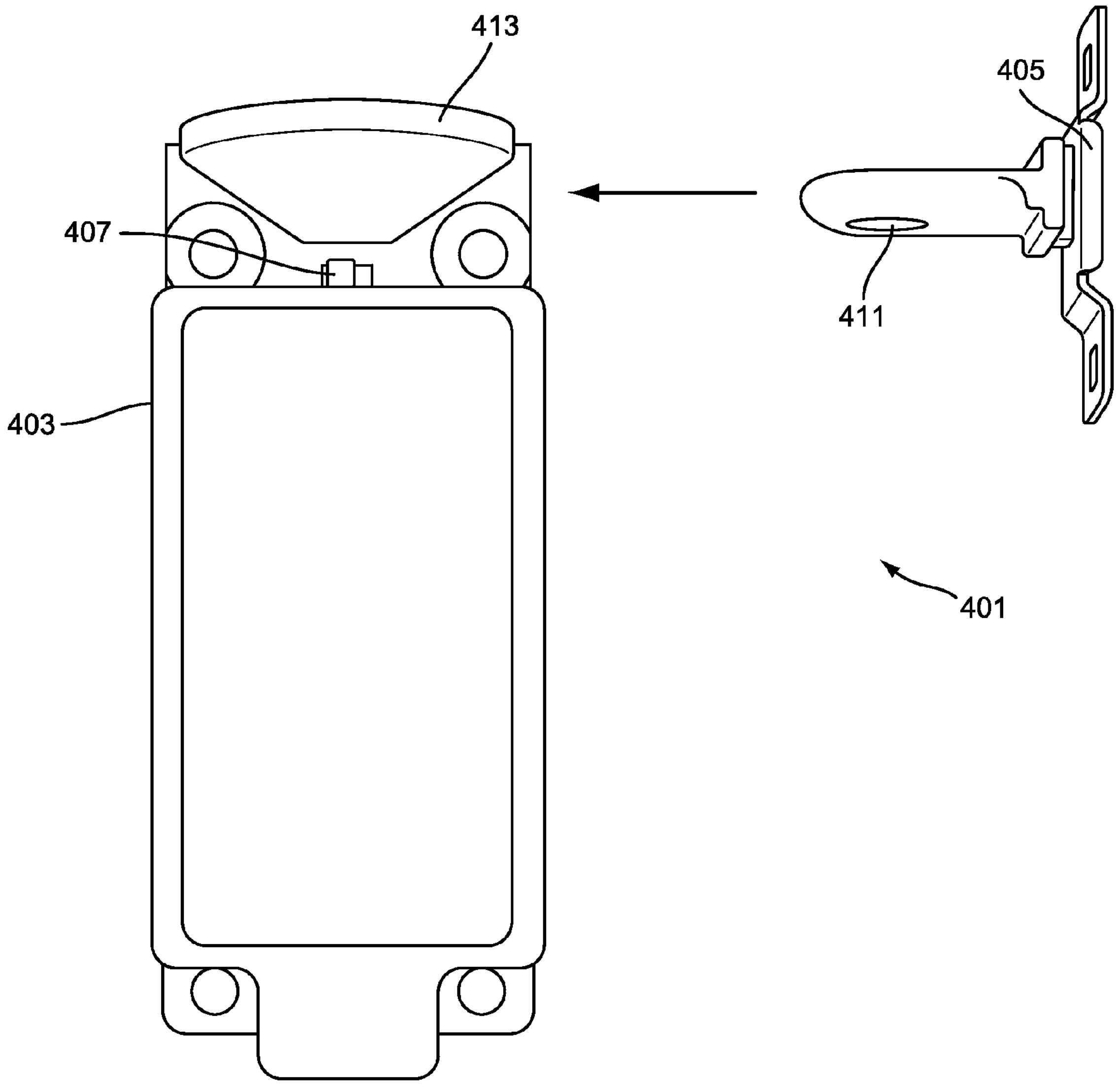
FIG. 4 illustrates an example electric lock configured for use in an access control device according to one or more aspects described herein.

FIG. 4 illustrates an electric lock 401 that may be used to secure a storage device such as storage device 100 of FIG. 1 or a portion thereof. Electric lock 401 includes a first portion 403 that includes an extendable and retractable lock solenoid 407 and a backing plate 413 that prevents the lock solenoid 407 from extending beyond that point. Electric lock 401 further includes a second portion 405 that includes an aperture 411 configured to receive lock solenoid 407. First portion 403 is configured to be mounted on the door (e.g., door 103 or 105 of FIG. 1) or the housing while the second portion 405 is mounted on whichever of the door and the housing to which the first portion 403 is not mounted. First portion 403 and second portion 405 may be mounted such that when the door is closed, aperture 411 is disposed in region 413 of first portion 403. Solenoid 407 may be electrically actuated using a piston/cylinder configuration through magnetics, hydraulics and/or pneumatics. In an unpowered state, solenoid 407 may remain in an extended position for fail secure configurations or a retracted position for fail unlocked assembly.

Figure 5:
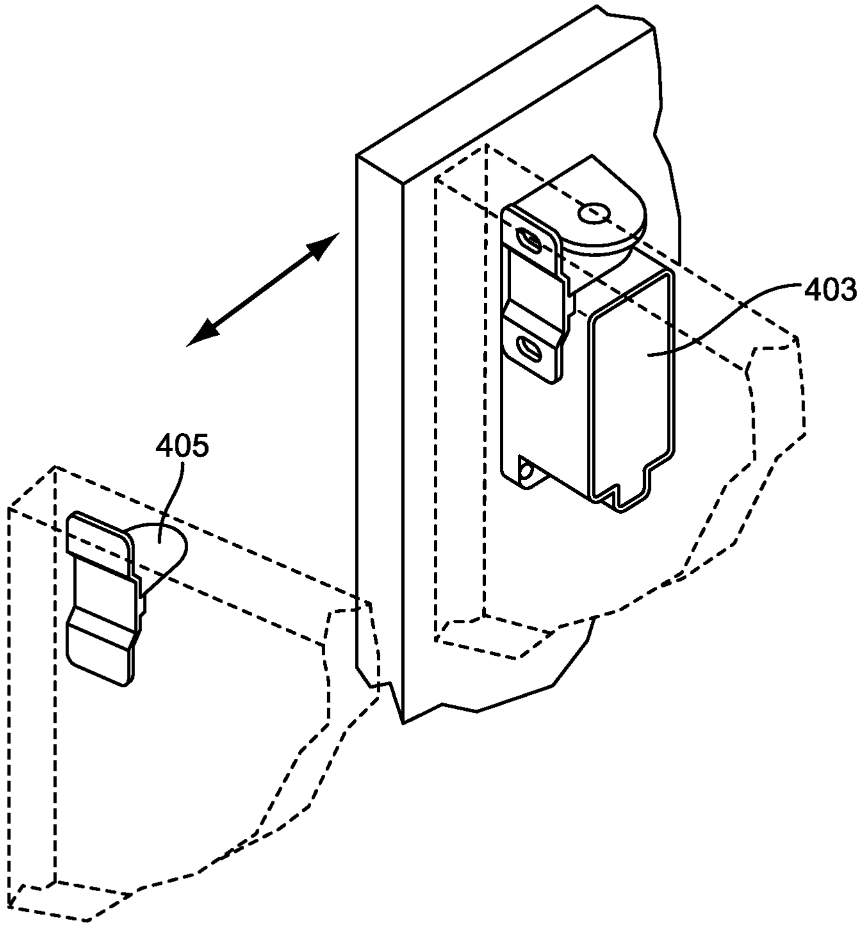
FIG. 5 illustrates an example mounting configuration for an electric lock according to one or more aspects described herein.

FIG. 5 illustrates an example mounting configuration for the electric lock 401 of FIG. 4. As shown, second portion 405 is configured to mate with a receiving section of first portion 403. A solenoid (not shown) may extend from first portion 403 through an aperture of second portion 405, thereby securing second portion 405 (and a door to which the second portion 405 is mounted) to the first portion 403 (and a housing to which the first portion 403 is mounted).

Figure 6:
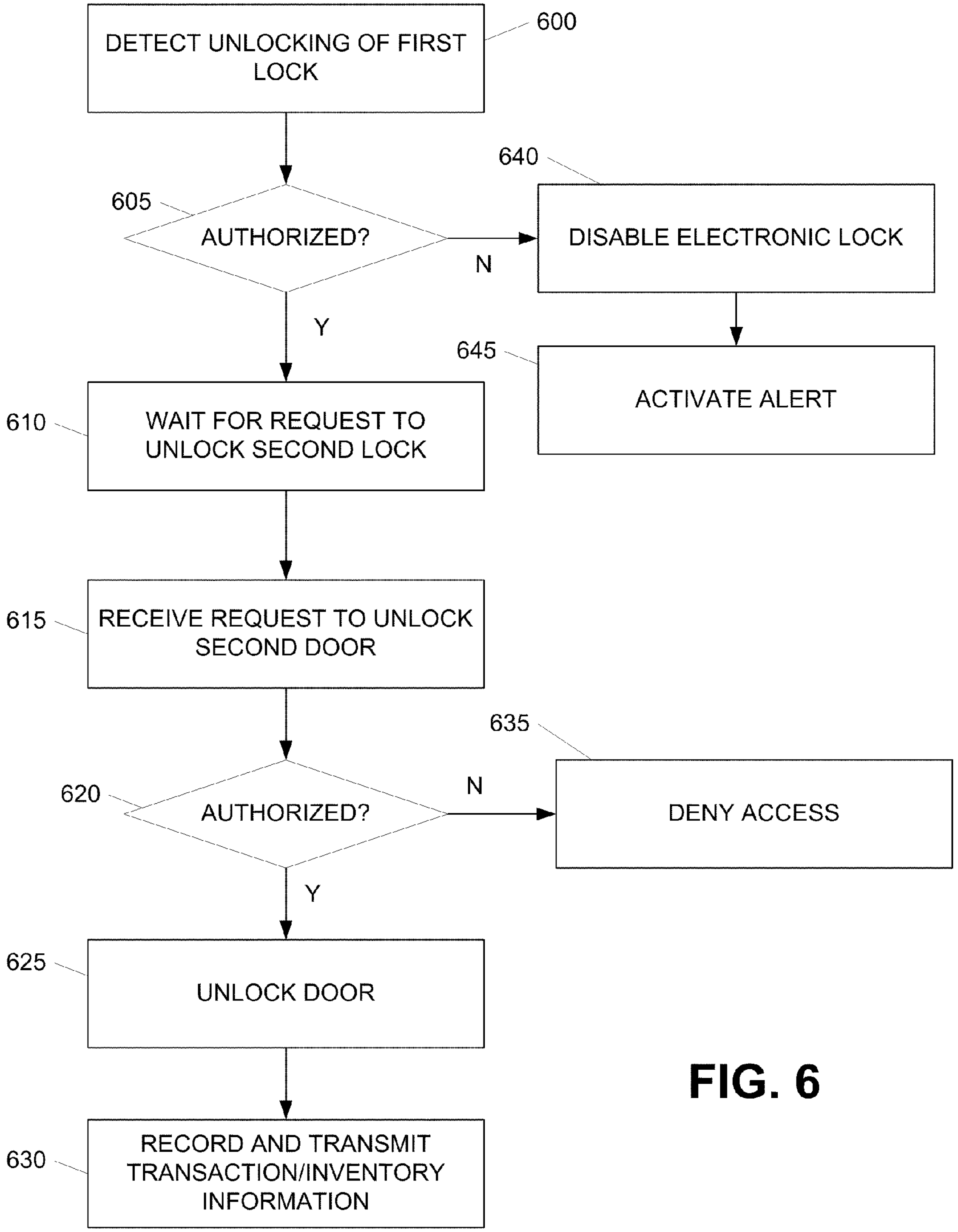
FIG. 6 is a flowchart illustrating an example method to track access and inventory of stored items according to one or more aspects described herein.

FIG. 6 illustrates a flowchart for a method to track access and inventory of stored items. In step 600, a storage device may detect the unlocking of a first lock and a corresponding first door. The unlocking of the first lock and the first door may be detected by determining that an appropriate key was used in a physical lock and/or that an appropriate identifier and/or password was submitted for an electronic lock. In step 605, the device may determine whether the first door was opened in an authorized manner. For example, the device may determine if force was used to open the first door. Various detection mechanisms may be used such as force meters, trip wires that are triggered if force is used and the like. If the first door was not unlocked/opened in an authorized manner, the device may disable the electronic lock in step 640 regardless of whether the accessing individual has an authorized key. Optionally, an alert may be activated in step 645. For example, an alert may include an audible sound, a visual cue, a transmission to a remote system such as a mobile phone, a central office responsible for the storage device, a police station, a hospital and the like.

If, however, the first lock was unlocked or released in an authorized manner, the device may then wait for a request to unlock a second door of the storage device in step 610. In step 615, the storage device may receive a request to unlock the second door. The request may include a key or user identifier stored electronically on an electronic access device, for example. In step 620, the storage device may determine whether to unlock the second door based on whether the key or user identifier is authorized to unlock the second lock/door. For example, the storage device may query a database (e.g., data access device 120) storing a list of authorized identifiers. The database may be remotely located or may be placed in a local area (e.g., within a portion of an emergency vehicle). If the key or user identifier is authorized, the storage device may disengage the second lock, thereby unlocking the second door in step 625. Additionally or alternatively, access to the storage device and changes in inventory may be recorded in a database and/or transmitted to a remote server in step 630. If, on the other hand, the key or user identifier is not authorized (or not recognized), access may be denied and the second door and lock may remain locked in step 635.

Various types of electronic and physical locks may be used and are not limited to those described herein. Additionally, various shapes and configurations of storage devices may also be configured to operate with the methods and systems described herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A pharmaceutical storage and transport system comprising:

a housing configured to physically connect to a vehicle and having a climate-controlled internal pharmaceutical storage compartment;

a plurality of doors connected to the housing, wherein a first door includes a first physical lock and a second door includes an electronic lock, wherein unlocking the first and second doors are required to access the climate-controlled internal pharmaceutical storage compartment; and a data access device configured to receive unlocking information from the electronic lock and to store the unlocking information, wherein the data access device is configured to be electrically connected to the vehicle in a fail secure manner conditioned upon receiving power from the vehicle, wherein when it is determined that the vehicle is in a powered-off state, the data access device is configured to prevent access to the climate-controlled internal pharmaceutical storage compartment by placing the climate-controlled internal pharmaceutical storage compartment into a locked state, and wherein when it is determined that the vehicle is in a powered on state and a request to access the climate-controlled internal pharmaceutical storage compartment is authorized, the data access device is configured to unlock the electronic lock to provide access to the climate-controlled internal pharmaceutical storage compartment.

2. The system of claim 1, wherein the electronic lock is associated with an electronic scanner device configured to read identification information from an electronic key.

3. The system of claim 1, wherein unlocking the second door requires unlocking the first door.

4. The system of claim 1, further comprising a wireless communication device configured to perform at least one of:

transmitting information relating to accessing the climate-controlled internal pharmaceutical storage compartment to a remote device; and receiving information relating to accessing the climate-controlled internal pharmaceutical storage compartment from the remote device.

5. The system of claim 1, wherein the data access device is further configured to receive information specifying a change in inventory in the climate-controlled internal pharmaceutical storage compartment.

6. The system of claim 1, wherein the data access device is in a separate location from the housing.

7. The system of claim 1, wherein the powered-off state of the vehicle includes an engine of the vehicle not running.

8. One or more non-transitory computer-readable media storing computer-executable instructions that, when executed by a processor, cause at least one computing device to:

detect opening of a first door of an access controlled storage device configured to store a pharmaceutical, the first door having a first lock, the access controlled storage device being configured to connect to a vehicle;

determine whether the opening of the first door was authorized;

in response to determining that the opening of the first door was authorized, wait for a request to open a second door;

receive the request to open the second door, the request including a request to unlock a second lock of the second door, wherein the second lock includes an electronic lock;

determine whether the request to open the second door is authorized;

in response to determining that the request to open the second door is authorized, determine whether the vehicle is in a powered on state and, responsive to determining that the vehicle is in a powered on state, unlock the second door and provide access to a climate-controlled interior pharmaceutical storage compartment of the access controlled storage device;

record the access to the climate-controlled interior pharmaceutical storage compartment; and responsive to determining that the vehicle is not in the powered on state, prevent access to the climate-controlled interior pharmaceutical storage compartment of the access controlled storage device.

9. The one or more non-transitory computer-readable media of claim 8, wherein determining whether the opening of the first door was authorized includes determining whether a first key was used to unlock the first lock.

10. The one or more non-transitory computer-readable media of claim 8, wherein recording the access to the climate-controlled interior pharmaceutical storage compartment includes transmitting access information to a data storage device.

11. The one or more non-transitory computer readable media of claim 10, wherein transmitting access information to the data storage device includes transmitting the access information over a wireless connection.

12. The one or more non-transitory computer-readable media of claim 10, wherein the data storage device is located remotely from the access controlled storage device.

13. The one or more non-transitory computer-readable media of claim 8, wherein determining whether the request to open the second door is authorized includes transmitting the request to a remote server and receiving a response indicating whether the request is authorized.

14. The one or more non-transitory computer-readable media of claim 8, further comprising recording a change in inventory of the access controlled storage device.

15. A method comprising:

detecting, by an access control device configured to be electrically connected to a vehicle, a first opening of a first door of an access controlled storage device configured to store a pharmaceutical, the first door having a first lock, the access controlled storage device being configured to connect to the vehicle;

determining, by the access control device, whether the first opening of the first door was authorized;

in response to determining that the first opening of the first door was authorized, waiting for a first request to open a second door;

receiving a first request to unlock a second lock of the second door to open the second door, wherein the second lock includes an electronic lock;

determining whether the first request is authorized;

in response to determining that the first request is authorized, determining whether the vehicle is in a powered on state and, responsive to determining that the vehicle is in a powered on state, unlocking the second door and providing access to a climate-controlled interior pharmaceutical storage compartment of the access controlled storage device;

recording the access to the climate-controlled interior pharmaceutical storage compartment;

detecting, by the access control device, a second opening of the first door of the access controlled storage device;

determining, by the access control device, whether the second opening of the first door was authorized;

in response to determining that the second opening of the first door was authorized, waiting for a second request to unlock the second lock to open the second door;

receiving the second request to unlock the second lock to open the second door;

determining whether the second request is authorized;

in response to determining that the second request is authorized, determining whether the vehicle is in the powered on state and, responsive to determining that the vehicle is not in the powered on state, preventing access to the climate-controlled interior pharmaceutical storage compartment of the access controlled storage device.

16. The method of claim 15, wherein determining whether the first opening of the first door and the second opening of the first door were authorized includes determining whether a first key was used to unlock the first lock.

17. The method of claim 15, wherein recording the access to the climate-controlled interior pharmaceutical storage compartment includes wirelessly transmitting access information to a data storage device using a wireless communication device.

18. The method of claim 17, wherein the data storage device is located remotely from the access controlled storage device.

19. The method of claim 15, wherein determining whether the first request to open the second door and the second request to open the second are authorized includes transmitting the requests to a remote server and receiving a response indicating whether the requests are authorized.

20. The method of claim 15, further comprising recording a change in inventory of the access controlled storage device.

* * * * *